United States Patent
Nguyen et al.

[11] Patent Number: 5,956,353
[45] Date of Patent: Sep. 21, 1999

[54] FREE ELECTRON LASER WITH MASKED CHICANE

[75] Inventors: Dinh C. Nguyen; Bruce E. Carlsten, both of Los Alamos, N.Mex.

[73] Assignee: Regent of the University of California, Los Alamos, N.Mex.

[21] Appl. No.: 08/915,235

[22] Filed: Aug. 20, 1997

Related U.S. Application Data

[60] Provisional application No. 60/024,282, Aug. 21, 1996.
[51] Int. Cl.⁶ ....................................................... H01S 3/02
[52] U.S. Cl. ..................................................... 372/2
[58] Field of Search .................................... 372/2

[56] References Cited

U.S. PATENT DOCUMENTS

| | | | |
|---|---|---|---|
| 5,130,994 | 7/1992 | Madey et al. ............................... | 372/2 |
| 5,637,879 | 6/1997 | Schueler ............................ | 250/492.21 |

OTHER PUBLICATIONS

Bruce E. Carlsten and Steven J. Russell, "Subpicosecond Compression of 0.1–1 nC Electron Bunches with a Magnetic Chicane at 8 MeV", Physical Review E, vol. 53, No. 3, pp. R2072–R2075, Mar. 1996.

B. E. Carlsten, B. D. McVey, E.M. Svaton, G.R. Magelesen, and L.M. Young, "Magnetic Bunchers for the Generation of High Peak Current, Low Emittance Electron Pulses at Medium Energy", pp. 641–643, Proc. of 1990 Linear Accelerator Conference, Albuquerque N.M., Sep. 1990.

*Primary Examiner*—John D. Lee
*Attorney, Agent, or Firm*—RGW

[57] ABSTRACT

A free electron laser (FEL) is provided with an accelerator for outputting electron beam pulses; a buncher for modulating each one of the electron beam pulses to form each pulse into longitudinally dispersed bunches of electrons; and a wiggler for generating coherent light from the longitudinally dispersed bunches of electrons. The electron beam buncher is a chicane having a mask for physically modulating the electron beam pulses to form a series of electron beam bunches for input to the wiggler. In a preferred embodiment, the mask is located in the chicane at a position where each electron beam pulse has a maximum dispersion.

4 Claims, 5 Drawing Sheets

FREE ELECTRON LASER WITH MASKED CHICANE

This application claims the benefit of provisional U.S. application No. 60/024,282, filed Aug. 21, 1996.

This invention relates to free electron lasers, and, more particularly, to self-amplified spontaneous emission free electron lasers. This invention was made with government support under Contract No. W-7405-ENG-36 awarded by the U.S. Department of Energy. The government has certain rights in the invention.

BACKGROUND OF THE INVENTION

In conventional free electron lasers (FEL), a beam of relativistic electrons passes through a static periodic magnetic field (wiggler) to amplify a coherent optical wave to produce a powerful beam of coherent light. The pondermotive potential set up by the optical wave and the wiggler field modulates the electron beam longitudinal density on the order of a wavelength of light to form electron bunches. Electron bunching only occurs effectively after the optical wave intensity has built up after several round trips between mirrors in the resonator. This necessitates precise alignment of the resonator mirrors to ensure temporal and spatial overlap between the electron beam pulses and the optical pulses. The precise alignment of the resonator mirrors is critical to the performance of the FEL. Even a small misalignment of the mirrors can disrupt operation of the FEL.

Because of this problem, many FELs employ very sophisticated and expensive mirror alignment procedures. In addition, the efficient extraction of the electron beam energy requires very high intracavity optical power, which itself repetitively subjects the resonator mirrors to excessive optical intensity. The resulting mirror damage often sets a limit on the peak power attainable with such FELs.

Another FEL method involves self-amplified spontaneous emission (SASE) of light. These FELs do not use resonator mirrors, and do not suffer from the problems outlined above. However, SASE requires a very bright electron beam (i.e. high peak current, low emittance and energy spread), and a very long undulator to build up the beam intensity from spontaneous noise to a saturated intensity. The use of a long undulator necessarily causes excessive optical vignetting loss, which requires the use of optical guiding. But, for optical guiding to be effective, the small-signal gain has to be very high and the undulator has to be fabricated to extreme precision. All of this places extremely stringent requirements on the electron beam quality and the undulator performance.

The present invention provides a new, and significantly improved technique for generating coherent radiation with electron beams traveling near the speed of light in a magnetic undulator, without the need for resonator mirrors or optical guiding.

Accordingly, it is an object of the present invention to provide a FEL that does not require resonator mirrors for optical intensity build-up.

It is another object of the present invention to provide a FEL that does not require optical guiding for optical beam propagation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a free electron laser (FEL) having an accelerator for outputting electron beam pulses; a buncher for modulating each one of the electron beam pulses to form each pulse into longitudinally dispersed bunches of electrons; and a wiggler for generating coherent light from the longitudinally dispersed bunches of electrons. The electron beam buncher is a chicane having a mask for physically modulating the electron beam pulses. In a preferred embodiment, the mask is located in the chicane at a position where each electron beam pulse has a maximum dispersion.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1A:
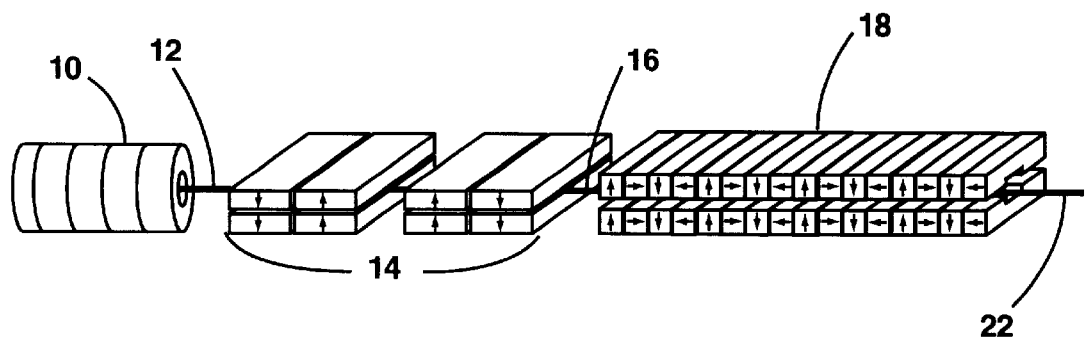
FIG. 1A is a diagram of a FEL according to the present invention

In accordance with the present invention, coherent infrared radiation is produced, similar to a conventional FEL, but without either resonator mirrors or optical guiding. Thus, as shown in FIG. 1A, a FEL is provided by only accelerator 10 outputting electron beam 12, which is a series of electron pulses, to buncher 14. Buncher 14 modulates each electron pulse to form a series of electron bunches 16 within each pulse. Electron bunches 16 are input to wiggler 18 for interacting with the combined magnetic and optical fields so that coherent light 22 is output from wiggler 18. While a preferred wiggler 18 does not require mirrors for optical pulse amplification, the electron pulses formed according to the present invention may be input to any wiggler, including wigglers with resonator mirrors.

Figure 1B:
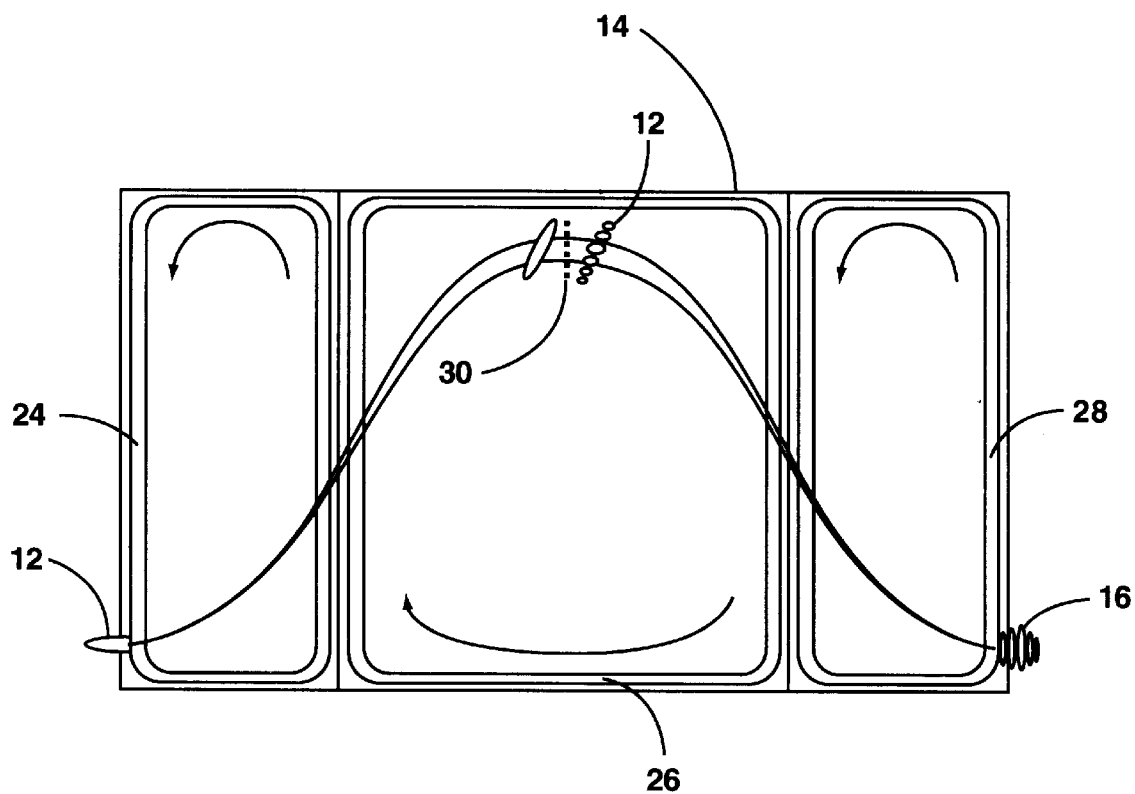
FIG. 1B is a cross-section of a chicane buncher according to one embodiment of the present invention.

Electron bunches 16 are formed in a masked chicane 14, shown in FIG. 1B, that uses a series of magnetic fields, e.g., magnetic fields produced by currents in conductors 24, 26, and 28, to produce a transverse spatial dispersion of electrons in electron beam 12 as a function of electron energy γ. As used herein, "chicane" means a series of magnets that produce magnetic fields effective to disperse and focus electron beams. The directions of current flows in conductors 24, 26, and 28 are indicated by the curved arrows. A mask 30, e.g., a wire grid or mesh, is placed at a location of maximum dispersion of electron beam 12 in chicane 14 to physically modulate the transverse density of electron beam 12. At the exit of chicane 14, input electron beam 12 has been converted to a longitudinally modulated distribution of electron bunches 16 having separations on the order of an optical wavelength.

Figure 2:
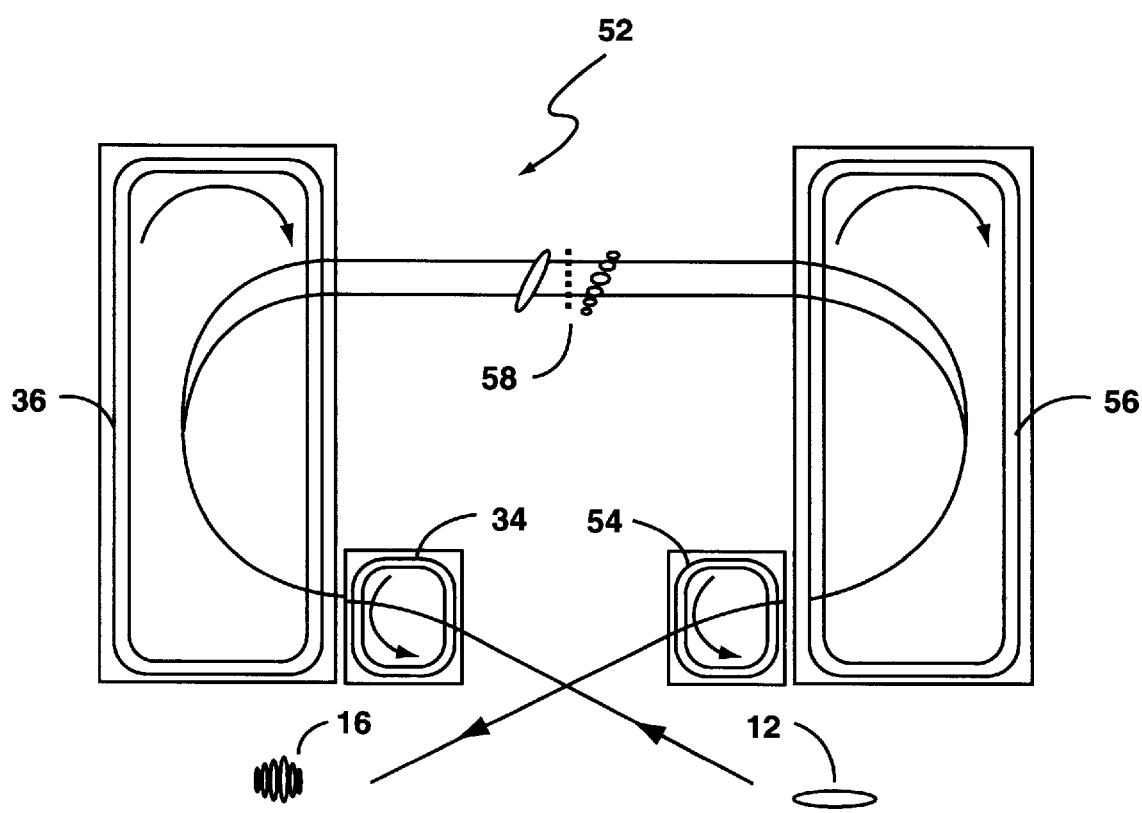
FIG. 2 is a diagram of the buncher according to an alternate embodiment of the present invention.

FIG. 2 is an alternate embodiment of chicane 52 for producing a stream of discrete, modulated electron bunches. Chicane 52 shown in FIG. 2 uses the magnetic field produced by current in conductors 34 and 36 to initiate spatial transverse dispersion of electron beam 12. At the location of maximum transverse dispersion, the transverse beam density and, thus, its energy, is modulated by mask 58. The magnetic fields produced by conductors 54 and 56 then reform the stream of modulated electron bunches into a longitudinal stream for output as electron bunches 16.

Figure 3A:
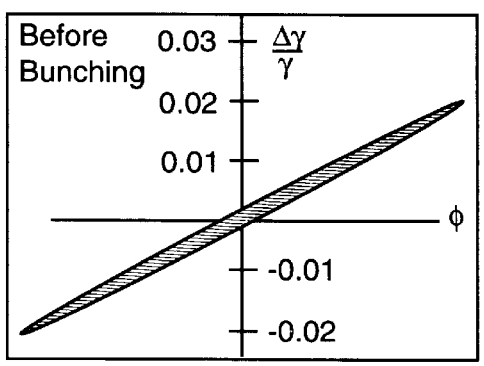
FIGS. 3A–D are exemplary phase-space diagrams representing the action of a masked chicane according to the present invention.
Figure 3B:
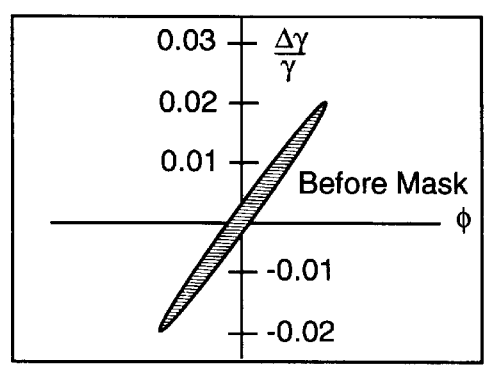

The prebunching of the electron beam with the chicane embodiment shown in FIG. 1B is illustrated with the assistance of the phase-space diagrams shown in FIGS. 3A–D. First, a positive, linear energy-phase correlation is imposed on the input beam at FIG. 3A by accelerator 10 in FIG. 1A. Then, partial compression occurs because the magnetic field produced by the currents in conductors 24 and 26 of chicane 14 interacts with the electron beam to delay electrons with different beam energies by different amounts along the phase axis, effectively rotating the phase-space ellipse toward vertical, as shown in FIG. 3B.

Figure 3D:
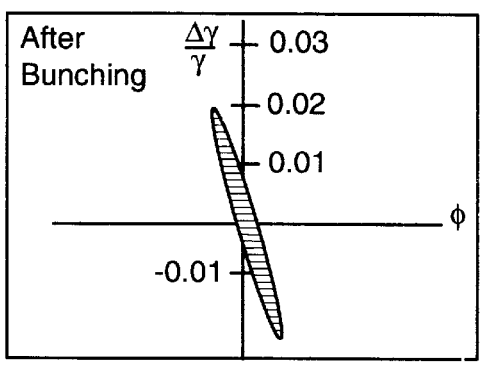
Figure 3C:
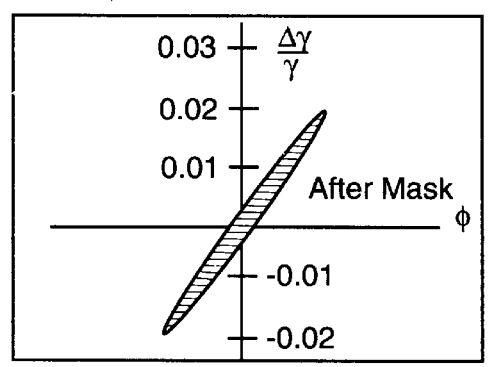

In the mid-section of chicane 14, the different beam energies are dispersed transversely. With proper focusing at this point, there exists a linear energy-transverse space correlation. A transmission mask, e.g., a series of wires with the appropriate spacing, slices the electron beam into a number of bunches, or "beamlets," each having a slightly different energy, as shown in FIG. 3C.

In the second half of the chicane, the beam is deliberately overbunched. This is illustrated by the ellipse being rotated slightly past the vertical as shown in FIG. 3D. Since the energy-phase correlation is still linear but at a steeper slope, the projection of the beamlets onto the phase axis exhibits modulations at a period smaller than the spacing of wires in grid 30. Thus, it is possible to control the electron bunch microscopic structure by adjusting the period defined by grid 30 spacing or by varying the chicane magnetic field. With a grid period on the order of a hundred microns, spatial modulations are superimposed onto the electron bunch density with dimensions as short as a few tens of microns.

Grid 30 (FIG. 1B), 58 (FIG. 2) can be fabricated by stringing a series of wires made of a high-Z material such as tungsten across the electron beam. For a 7.5 MeV beam, the beam energy loss per unit thickness is approximately 0.03% per micron. It is not necessary for the grid to completely block the beam. The wires in the grid are only thick enough to decelerate the beam such that the beamlets going through the wires do not follow the same general trajectory. The decelerated beams are removed later by use of a beam stop (not shown).

One consideration in the grid design is the possibility of destruction of the grid wires through heating. To address this concern, calculations were performed assuming a 200 $\mu$m thick tungsten wire that intercepts 50 pC of a 7.5 MeV beam. Such a beam striking the wire would lose 6% of its energy, depositing less than 22.5 $\mu$J per micropulse. With a 1 mm beam size in the y (transverse) direction, and using the heat capacity and density of tungsten, a temperature rise of 0.3° C. per micropulse was calculated. If the grid wires were repetitively subjected to 1000 micropulses, the resulting temperate rise in each wire would be less than 300° C., a negligible rise considering that the melting point of tungsten is 3410° C.

Figure 4:
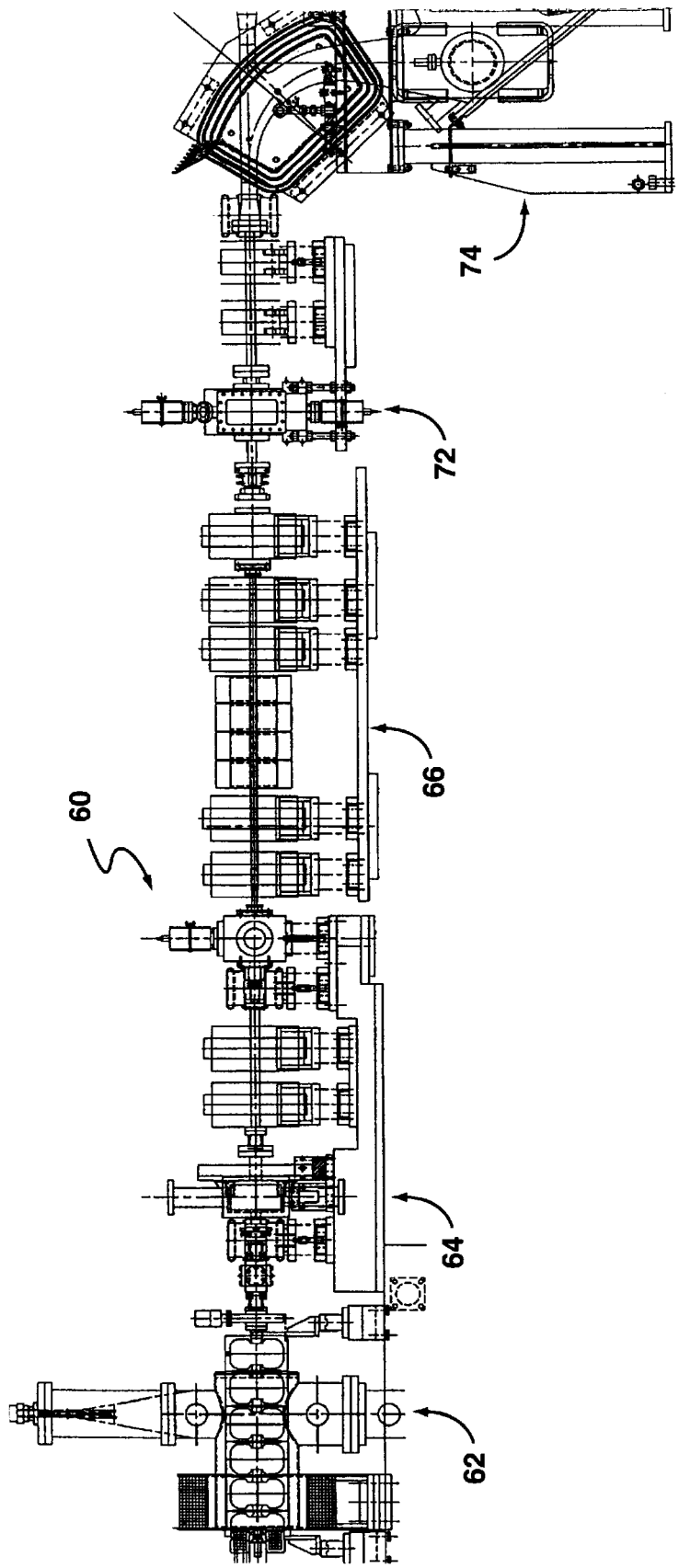
FIG. 4 is a diagram of the Subpicosecond High-brightness Accelerator Facility.

Simulations were performed using the PARMELA software available from Los Alamos National Laboratory to demonstrate the feasibility of the present invention in creating longitudinal density modulations with a grid masked chicane. This particle pushing code was modified to include a new card in the input deck, GRID, to specify the width and period of the wires in the grid mask. For these simulations, the experimental conditions of the Subpicosecond High-brightness Accelerator Facility 60 at Los Alamos National Laboratory, shown in FIG. 4, were used. The axial distance along the beam line components is provided in inches for reference. The main components of this accelerator system are a 7.5 MeV, 1300 MHz photoinjector 62, a phasing cavity 64 for controlling the electron pulse-energy slew, a four-dipole chicane 66, such as shown in FIG. 1B, and a fast deflector 72—an rf cavity that is used to deflect the electron bunch via the rf field in the cavity. The chicane dipoles are 20 cm long with 1.81 cm separation. At a dipole field of 2 kG, the electron beam bend radius is 34 cm and the bend angle is 36° for a 7.5 MeV beam. The simulations used an electron beam at 0.5 nC per pulse and an energy slew of 2.3%. The beam output characteristics are measured by spectrometer 74.

Figure 5A:
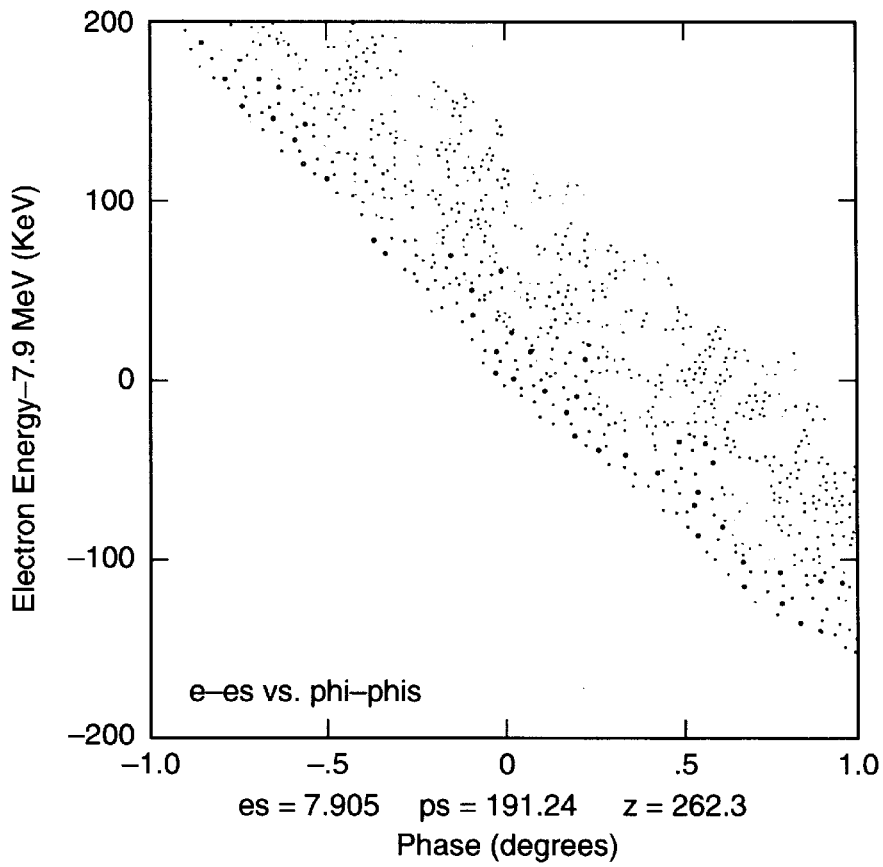
FIGS. 5A and 5B graphically depict the calculated longitudinal density distribution and energy-phase correlation of the electron beam at the exit of the chicane.
Figure 5B:
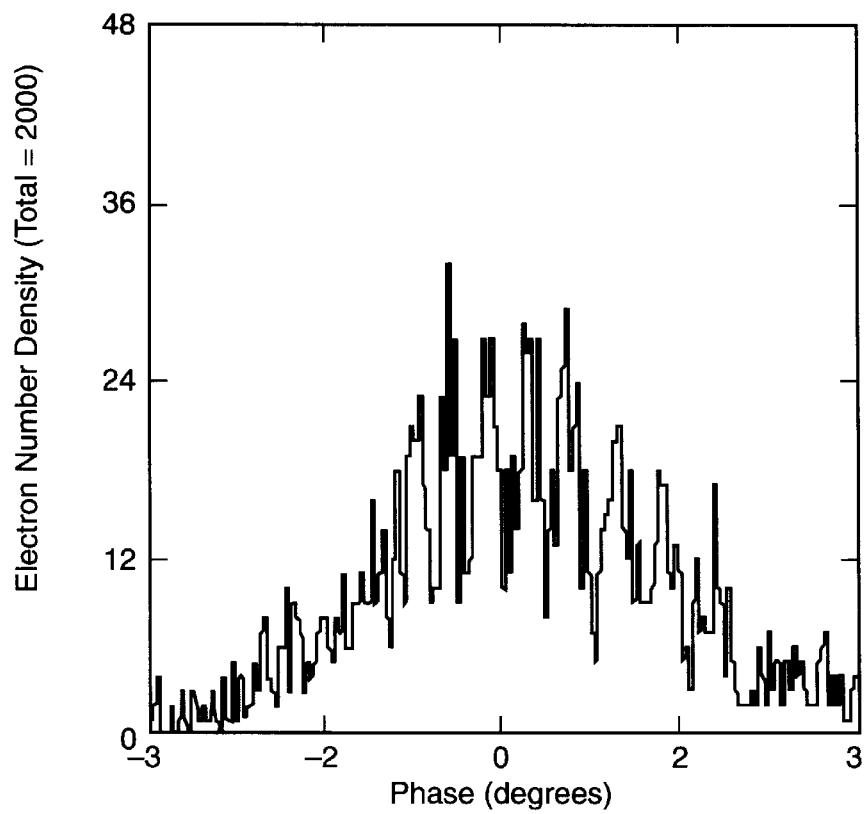

The calculated longitudinal density distribution and energy-phase correlation of the beam of the exit of the chicane are shown in FIGS. 5A and 5B, respectively. The wire spacing and thickness were 0.25 mm with a concomitant grid period of 0.5 mm. In the simulation, those particles striking the grid were completely removed, which created voids in the energy-versus-phase plot of the transmitted beam (FIG. 5A). In FIG. 5B the abscissa is the phase of a depicted particle (phi) minus the phase of a reference particle (phis) centered at a phase of 191.24° at a location of 262.3 cm along the beam with reference to the cathode. The ordinate is the number of particles at each relative phase angle, where the total number of particles in the simulation was 2000 (i.e., the integral under the curve).

At the end of the chicane, these voids also appear in the energy vs. phase plot (FIG. 5A). The abscissa is the same as in FIG. 5B with an expanded scale. The ordinate is the particle energy (e) in MeV minus the energy of a reference particle (es), where the difference is in KeV. The beam longitudinal density exhibits strong modulations at a period of ~200 $\mu$m. Shorter modulation periods can be obtained by reducing the grid spacing or by employing a more dispersive buncher, such as a circular buncher (FIG. 2). Alternatively, an "optical grid" with very short periods can be produced by the standing wave pattern of an intense laser beam.

The undulator radiation produced by the prebunched beams is expected to be several orders of magnitude larger in amplitude than produced by the spontaneous emission. Moreover, because the pulse contains many modulations, the coherently emitted radiation is expected to experience gain and grow exponentially. If the electron density is sufficiently high, this coherent emission will saturate within a few gain lengths.

The present invention provides four advantages. First, the self-amplified coherent radiation does not start from noise, but from prebunched electron beam coherent emission. The coherent emission of prebunched electron beams is orders of magnitude above the spontaneous emission. As a result, the self-amplified coherent radiation will reach saturation in a relatively short undulator, compared to SASE. Second, because the seed radiation originates at a well-defined time, the self-amplified coherent radiation will be very stable in phase. Third, unlike convention FEL oscillators, every electron pulse in this invention emits a pulse of high power radiation. In addition to improving the overall efficiency, this invention makes it very easy to switch out a single pulse without the need of an optical pulse slicer. Fourth, this approach eliminates the complications associated with resonator mirrors such as optical damage and stringent mirror alignment.

Additionally, if the input electron beam is of sufficiently high quality, the longitudinal beam density will exhibit sharp modulations. These modulations will have high harmonic content and are thus suitable for the generation of harmonic frequencies. Therefore, the technique will enhance the harmonic generation and enable the production of shorter wavelength light.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A free electron laser (FEL) comprising:
   an accelerator for outputting electron beam pulses;
   a buncher for modulating each one of said electron beam pulses to form each pulse into longitudinally dispersed bunches of electrons; and
   a wiggler for generating coherent light from said longitudinally dispersed bunches of electrons;
   where said buncher is a chicane having a mask formed from a plurality of wires for physically intercepting said electron beam pulses to create said bunches of electrons.

2. A FEL according to claim 1, wherein said mask is located in said chicane where said electron beam pulses have a maximum dispersion.

3. A chicane for use in a FEL having an accelerator for outputting electron beam pulses and a wiggler for converting energy in said electron beam pulses into electromagnetic radiation, said chicane comprising:
   electromagnetic dipoles for dispersing each one of said electron beam pulses; and
   a mask formed of a plurality of wires located in said chicane for physically intercepting said electron beam pulses to modulate said electron beam pulses into discrete, physically separated electron bunches.

4. A chicane according to claim 3, wherein said mask is located in said chicane where said electron beam pulses have a maximum dispersion.

* * * * *